United States Patent [19]
Busse et al.

[11] 3,826,374
[45] July 30, 1974

[54] APPARATUS ENABLING THE SHIFTING OF GROUPS OF FILTER PLATES IN A FILTER PRESS

[75] Inventors: Oswald Busse; Hugo Klesper, both of Aarbergen, Germany

[73] Assignee: Passavant-Werke Michelbacher Hutte, Aarbergen, Germany

[22] Filed: May 24, 1973

[21] Appl. No.: 363,552

[30] Foreign Application Priority Data
June 2, 1972  Germany............................ 2226957

[52] U.S. Cl.................................. 210/225, 210/236
[51] Int. Cl............................................. B01d 25/32
[58] Field of Search ....... 210/225, 236 X, 324, 327, 210/328, 332, 407

[56] References Cited
UNITED STATES PATENTS
3,153,630  10/1964  Green............................ 210/236 X
3,561,600  2/1971  Kurita................................ 210/225
3,690,462  9/1972  Kurita................................ 210/225
3,696,930  10/1972  Tokura.............................. 210/225

*Primary Examiner*—Roy Lake
*Assistant Examiner*—DeWalden W. Jones
*Attorney, Agent, or Firm*—Larson, Taylor and Hinds

[57]   ABSTRACT

Adjacent filter plates of a filter press are connected by links permitting the plates to close and separate. Some plates have a cam thereon which moves between an operative position and a neutral position, moving to the former position in response to movement of its associated links to a filter plate separated condition. An engaging dog moves along the filter press, engaging an operative cam to move at least one but preferably a group of filter plates to an open, separated condition.

16 Claims, 4 Drawing Figures

APPARATUS ENABLING THE SHIFTING OF GROUPS OF FILTER PLATES IN A FILTER PRESS

BACKGROUND OF THE INVENTION

This invention relates to filter presses, and in particular it relates to a new and improved arrangement for shifting the filter plates of a filter press.

The filter plates of a filter press must be shifted laterally after each dewatering cycle so as to permit removal of filter cake and introduction of washing means between said filter plates. The procedure requires a minimum spacing of adjacent plates. However, the total of all individual spaces between adjacent plates in the press would in general exceed the range of lateral displacement of the hydraulic head piece, so therefore the filter plates may not be shifted simultaneously but successively. The procedure of shifting the plates one by one so as to make the filter cake drop out is, of course, very time-consuming. It has therefore been suggested to shift and open the filter plates by groups or bundles thereby discharging and washing several plates simultaneously. But to date the cost of control apparatus required for shifting plates in bundles or groups has been prohibitive.

Thus, there exists a need for a new and improved arrangement for shifting filter plates laterally which will permit shifting of the plates in groups, which arrangement is more simplified than previously known arrangements.

SUMMARY OF THE INVENTION

Thus, it is a purpose of the present invention to provide a new and improved arrangement which is relatively simple in its construction and operation for shifting of filter plates and preferably simultaneous shifting of groups of filter plates. In accordance with a feature of the present invention, the repetitive movements of a drive element are used to shift individual groups of filter plates by the required amounts in order to open the filter press.

According to a preferred embodiment of the present invention at least one engagement dog is drivable on a path perpendicular to the plane of the filter plates and in the longitudinal direction in which the press is opened and wherein each filter plate is equipped with at least one cam for cooperation with the engagement dog, said cam being adapted to assume a first operative position in which it projects in the path of the engagement dog and a second neutral position out of said path and wherein adjacent filter plates are connected in pairs by at least one connecting means which, when the filter plates are pulled apart, will change its position or form, thereby shifting the cam of one of the plates from neutral into the operative position.

As long as the filter plates are closed, their cams are in the neutral position and cannot be engaged by the dog. The press is opened by hydraulic displacement of the head piece whereby at least one but usually several plates are likewise shifted via connecting means causing the cams of said plates to change from the neutral into the operative position. The engagement dog on its next round will engage the cam of the last of said plates in the first group thereby pushing these plates together while simultaneously pulling the next group of filter plates apart via their connecting means. This operation may be repeated until all filter plates have been opened. It will be apparent that this can be done by a single, repetitive movement of only one engagement dog eliminating complex control gears for individual plate shifting means.

The connecting means connecting adjacent filter plates preferably comprises a pair of links hinged to each other and to the filter plates, said links being angled when the filter plates are abutting against each other and being straight when the plates are pulled apart; one link of each pair of connecting links being associated with a cam for common sluing therewith. To prevent the engagement dog from pushing the cam back into neutral position before the filter plate has been opened it is preferable to connect the cam with that link of the pair of connecting links which, when straightening, will move in the same sense of rotation as the cam when being engaged by the engagement dog. Therefore the connecting means while maintaining the links in a straight position will also prevent the cam from yielding and the links from buckling.

Preferably the engagement dog can move alternately in the direction in which the plates are pulled apart and in the opposite direction and being flexibly mounted the engagement dog is able to override the cams when moving in the opposite direction.

In principle, the cams and the dogs engaging them may be disposed at any point with respect to the filter plates, for instance, adjacent or under the plates. It is, however, advantageous if each filter plate is suspended from a carriage movable on a track means and if the connecting means and cams are mounted on the carriage above the filter plates; the engagement dog or dogs being movable in tracks disposed above the track means for the carriages. The connecting means, in particular links connecting the plates or carriages, may have an additional function; they may be adapted to maintain the plates or carriages supporting the plates in true vertical position with respect to the direction of lateral shifting. The connecting means are therefore disposed in pairs bilaterally of the vertical median plane of the filter plates; and each filter plate is preferably associated with two links disposed in symmetry with the median plane of the plates. The connecting links may be affixed with their respective hubs to the axle supporting the rollers of the carriages, the cam projecting from said hubs. The frontmost plate is preferably connected to the hydraulically operated head piece of the press so as to be shifted therewith then the press if opened. The range of this initial shift determines the number of plates simultaneously shifted in the same direction by the connecting means. The space between the plates, i.e. the distance covered by the engagement dogs on each stroke should, of course, be long enough so that initial space allowed for by the head piece of the press can be fully utilized for subsequent groups of plates. In a preferred embodiment of the invention operation of the apparatus is further automated in so far as the movement of the engagement dog is reversed in dependence on the resistance offered by the cams to the engagement dogs. Thus, a filter plate will be moved by the dog engaging its cam until all preceding plates have been pushed together and abut against the head piece of the press. Then, with the resistance of the cam to the engagement dog growing considerably, a resistance-dependent switch may stop the advance of the engaging dog and reverse its movement.

A switch actuated in dependence on the position of the engaging dog at the moment of reversal may end the opening of the press and initiate its closing movement. This position switch is thus actuated when the engaging dog has shifted all filter plates against the head piece of the press. The whole press is closed by the hydraulically operated head piece and a new dewatering cycle may begin. In addition, cake removal means and/or plate washing means to be introduced between the open plates may be controlled by the rhythmic movement of the engaging dog or dogs. To remove the filter cloth it may be necessary to pull the filter plates further apart than the connecting links will permit. Therefore, the latter are easily detachable. In order to remove the filter cloth, the links can be detached so the plates may be moved as far apart as the shifting range of the head piece will permit; shifting is by hand or by means of auxiliary gear, as required.

The objects and advantages of the present invention will become apparent from the detailed description to follow.

BRIEF DESCRIPTION OF THE DRAWINGS

There follows a detailed description of a preferred embodiment of the invention to be read together with the accompanying drawings.

DETAILED DESCRIPTION OF THE PREFERRED EMBODIMENTS

Figure 1:
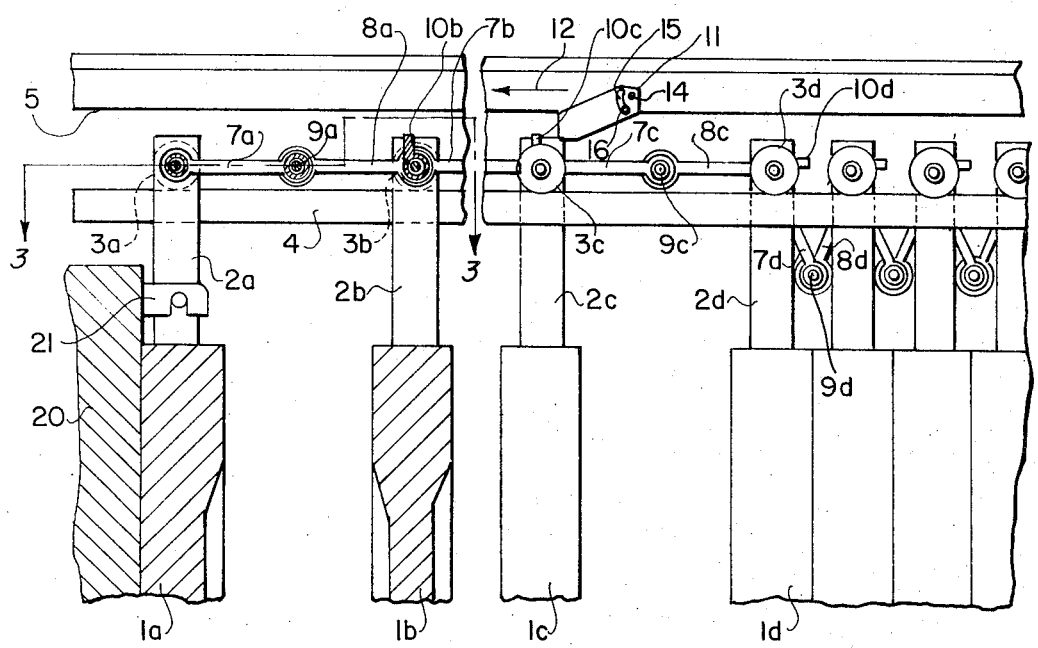
FIG. 1 is a vertical sectional view taken through the longitudinal vertical median plane of the apparatus, as represented by the line 1—1 in FIG. 3, of the two left hand filter plates, with the remaining filter plates shown in side elevation.

Referring now to the drawings, like elements are represented by like numerals throughout the several views.

Figure 2:
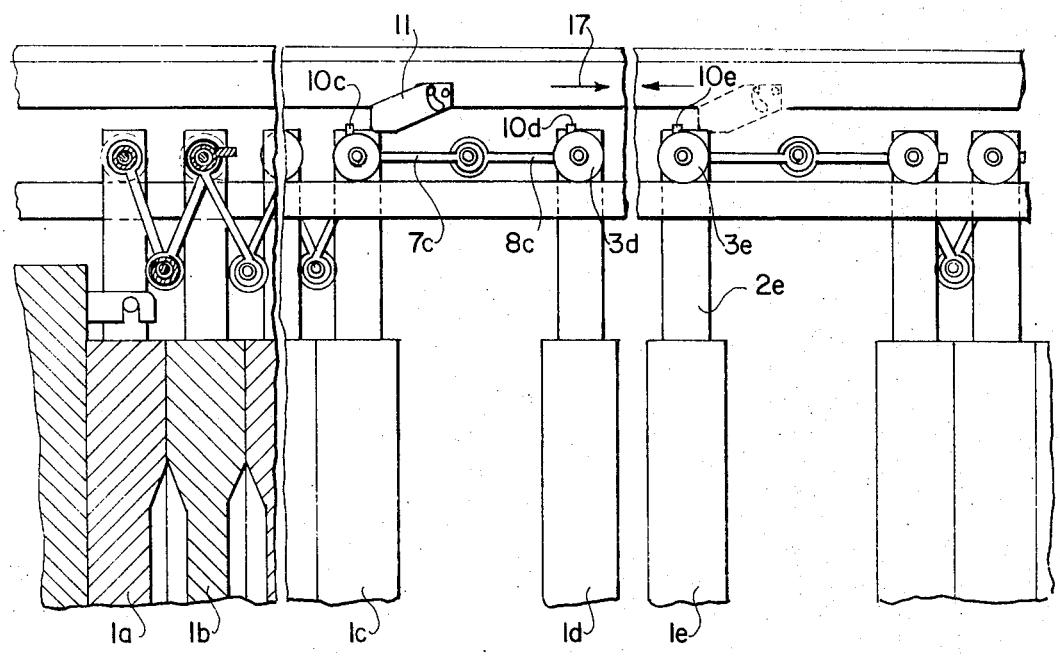
FIG. 2 is a vertical sectional view similar to FIG. 1 but showing the element in a different position.
Figure 3:
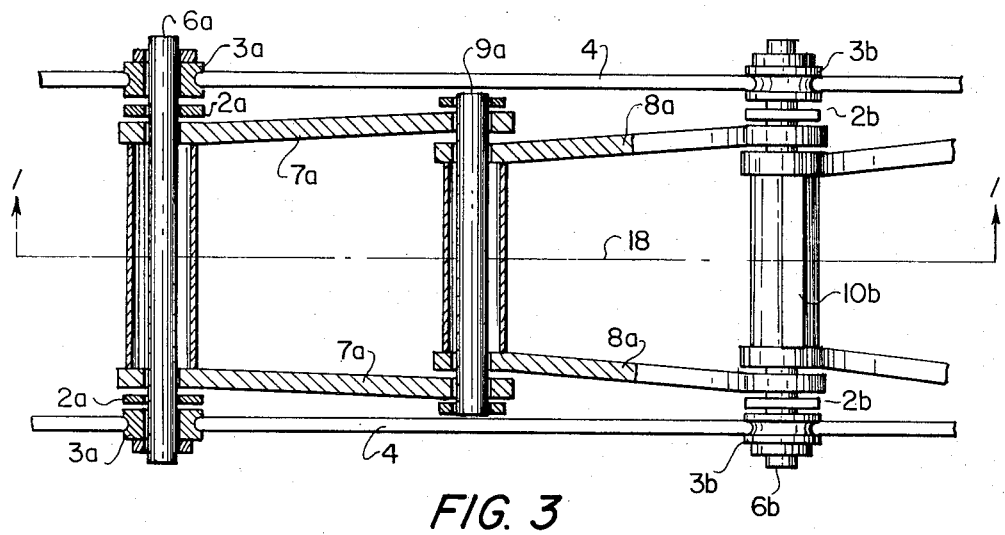
FIG. 3 is a horizontal sectional view taken along line 3—3 of FIG. 1.

Referring to FIGS. 1-3, the filter press comprises a plurality of filter plates 1. To facilitate describing the invention, five selected filter plates are indicated by the numbers 1a through 1e. These are five plates which have been selected to facilitate describing the invention and these are not necessarily five consecutive plates. Further, the elements associated with each of these plates (and in the case of the connecting links, the links to the right of the given plate) carry the same subscript.

The plates 1 are covered by a filter cloth for dewatering of slurry therebetween. The slurry inlet opening and the filtrate discharge opening are known per se and are not shown in the drawings. The filter plates 1 are suspended from carriages 2 and having rollers 3 movable along a track means in the form of rails 4 disposed in the bridges 5 above the filter plates 1. As shown in FIG. 3, the rollers 3 are mounted on a "known-out" spindle 6 on each of which a carriage 2 is suspended between the roller 3.

Adjacent carriages 2 are connected by connecting means comprising a pair of articulated connecting links 7, 8 mounted on the same knock-out spindle as the rollers 3 and they are connected by cam common joint pin 9.

With the exception of the first filter plate 1a all carriages 2 are provided with cams 10 each cam being connected for common pivoting with one of the links 7, 8, i.e. with the link which in FIG. 1 is shown on the right side of the associated carriage 2. The cams 10 may be an integral part of the hub of link 7 mounted on the knock-out spindle 6. From the right side of FIG. 1 referring for example to plate 1d it will be apparent that in a closed filter press the links 7 and 8 will extend downwardly forming an angle between themselves thereby maintaining the cams 10 in a horizontal position. When, however, two adjacent filter plates 1 are opened their associated links 7, 8 extend horizontally while the corresponding cam is turned upwardly in a vertical position. In this position the cam 10 is in the path of an engaging dog 11 reciprocating along a bridge 5. When moving in the direction indicated by arrow 12, the engaging dog 11 will engage the last one of the cams 10c thereby shifting the associated plate 1c in the direction as indicated.

The press is opened as follows: the hydraulically operated head piece 13 which presses the plates together when the press is closed is moved approximately 0.5 to 1 m (19.7 – 39.5 ins) away from the stack of plates. The head piece is connected with the adjacent filter plate 1a by one or several lugs 14 or by connecting means resembling links 7, 8 so that it will move this plate as well as several other plates 1, thereby stretching the connecting links 7, 8 between the plates. If, for instance, the links 7, 8 permit a maximum spacing between plates of 20 cm (7.8 ins) the number of plates that will be shifted together with the head piece 13 is five. The cake having formed between the plates will be removed and, if desired, washing means will be introduced to clean the empty plates. Then the engaging dog 11 will start moving in the direction as indicated in FIG. 1. It may be driven by a chain drive. The cams 10 of the stack of filter plates being in neutral, horizontal position, the engaging dog 11 will first engage the cam 10c of the last plate 1c having previously been shifted and will shift it to the left, thereby closing the filter plates to the left of plate 1c which previously had been pulled apart. As the dog with plate 1c moves to the left another stack of e.g. 5 filter plates on the right side of plate 1c will be pulled apart as the connecting means 7, 8 assume a straight horizontal position. The engaging dog is flexibly mounted by bearing means 14 and retention pin 15 in a curved slot 16 so that when reversed in the direction indicated by arrow 17 it will override the cams which are now in a vertical position. When again reversed in the direction as indicated by arrow 12, the dog 11 will engage the last upright cam 10 shifting another stack of e.g. five plates to the left. The minimum distance covered by the engaging dog 11 on its active run depends on the distance covered by the head piece 13 on its initial run opening the press, the reversed run of the engaging dog 11 in the direction of arrow 17 is at least double the active run.

Figure 4:
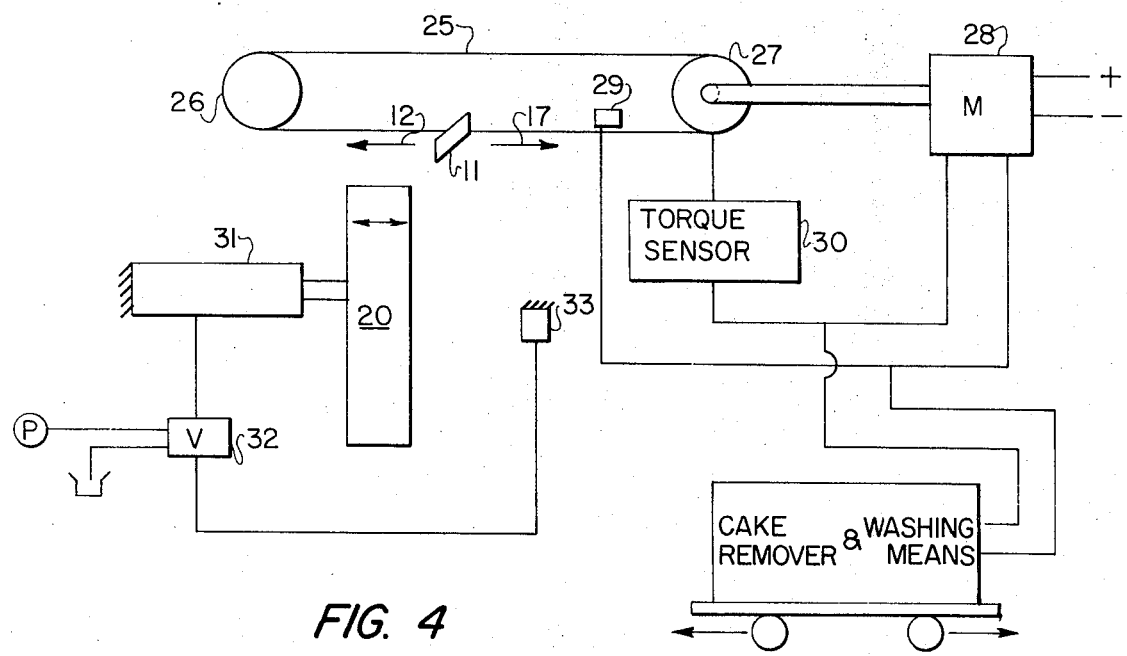
FIG. 4 is a diagrammatic view showing schematically the control means of the present invention.

FIG. 4 illustrates schematically a possible control means for automatically controlling the shifting in accordance with the features of the present invention. FIG. 4 illustrates an endless chain 25 mounted on sprockets 26 and 27, the latter being driven by an electric motor 28. An engagement dog 11 rides back and forth on the lower run of this endless chain. The arrows 12 and 17 of FIGS. 1 and 2 are included in FIG. 4. Other control means shown in FIG. 4, (the operation of which will be explained below) include a position sensing switch 29, a torque sensing device 30 and a position switch 33. Also shown is the head piece 20 of FIGS. 1 and 2 with operating means including a hydraulic piston and cylinder unit 31 and a valve 32 which controls the operation of the piston and cylinder unit 31. Also shown in FIG. 4 is a cake removing means combined with a washing means. These means are shown diagrammatically on a platform with wheels to represent the fact that such means is movable longitudinally to be positioned between any of the open filter plates.

The movement of the engaging dog 11 may be reversed by a power control means such as a torque sensor 30. As soon as the filter plates pushed by the engaging dog 11 abut against the head piece, the resistance against movement of the engaging dog 11 and hence also at the drive sprocket 27 increases. On reaching a certain amount, this torque is sensed by torque sensor 30 which transmits an electrical signal to the motor 28 reversing the direction of operation thereof and hence returning the dog 11 back to the right as indicated by arrows 17. Return movement of the dog 11 is terminated when the rear (the right-hand end) of the dog 11 engages position switch 29, the latter operating the motor 28 to reverse the direction thereof and hence reverse the direction of the dog 11. The engagement dog 11 is then moved forward and as described above it engages the cam at the rear of the currently opened group of plates closing these plates and opening a subsequent group of plates to the right thereof. The cycle repeats itself until the last filter plate has been shifted. The filter plates 1 are pushed against the head piece 13 and gradually the reversal point of the engaging dog 11 shifts to the right. A switch 33 may be arranged in a position such that after all plates have been shifted to the left and the last plate has been emptied, this last plate can engage the position switch 33 activating an electric control system to operate the valve 32 and hence also the piston and cylinder unit 31 to operate the head piece, i.e. to cause the latter to move to the right to close the filter press. The control features described above may also be used to control operation of other equipment such as the cake removal and/or the washing means. For example, as indicated in the figure, the elements 29 and 30 may also be electrically connected to operate the cake removal and/or washing means.

It is a particular advantage of the apparatus according to the invention that the filter plates in open position are equispaced so that spraying means generally used for washing the filter plates can easily be adjusted to such spaces. It is another advantage of the system according to the present invention that the filter plates are moved more slowly and yet the entire operation takes less time than that according to conventional systems wherein the plates are moved individually.

In order to facilitate removal of filter cloths at regular intervals, the connecting means between the plates or plate carriages respectively are easily detachable. The joint pins 9 connecting the links 7, 8 may simply be removed and the respective filter plates may be pulled further apart than the connecting links 7, 8 would permit, the maximum displacement being the amount by which the head piece 13 has been shifted initially. Thus plates are easily accessible for changing filter cloths or similar servicing.

From FIG. 3 it will be apparent that the connecting links 7 and 8 are arranged in pairs disposed symmetrically on both sides of the plane of symmetry 18 of the filter press. Thus they also guide the plate carriages 2 and maintain them in a position transverse to the vertical median plane 18.

The invention is not limited to the scope of the embodiments described and illustrated herein. The links 7, 8 for instance may be replaced by other connecting means, such as chains, ropes, etc. associated with respective cams 10 which on being tightened will shift in an operative position. Furthermore, links 7, 8 may be so arranged that they will deflect upwardly instead of downwardly or in a horizontal and not in a vertical plane, so that the cams 10 are shifted laterally with the engaging dogs 11 being arranged laterally of the carriages 2. Instead of reciprocating several appropriately spaced engaging dogs may be adapted to rotate and an auxiliary apparatus such as additional switch cams or an overload-responsive arrangement of cams 10 will then disengage the dogs which just have closed a previously opened stack of filter plates. These and various other changes in form and detail may be made without departing from the spirit and scope of the invention.

We claim:

1. A filter press comprising:
   a plurality of filter plates mounted in a row for movement in a longitudinal direction towards each other to form filter chambers between adjacent plates and away from each other for removal of the filter residue,
   at least some of said filter plates have a cam associated therewith and movable between an operative position and a neutral position,
   an engaging dog mounted to move along the filter press in said longitudinal direction in a path wherein the dog engages any cam in its path in the operative position and passes by any cam of filter plates which it passes which cam is in the neutral position,
   connecting means for connecting adjacent filter plates to allow the plates to close against each other and also to separate from each other by a predetermined amount, and means for interconnecting each com with one of the connecting means associated with its respective filter plate so that movement of said one connecting means from said closed position to said separated position causes the cam to move from said neutral position to said operative position.

2. A filter press according to claim 1, said connecting means between adjacent filter plates comprising a pair of connecting links pivotally connected together at first ends thereof and operatively connected one to each of the adjacent filter plates at the opposite ends thereof, said connecting links movable about said pivot connection towards each other when the adjacent plates close against each other and movable about said pivot connection away from each other to a more straightened condition when the adjacent plates move apart to the separated condition.

3 A filter press according to claim 2, each cam being operatively connected to one of the connecting links connected to its respective filter plate to move between the operative and the neutral positions in response to movement of that connecting link between the closed and straightened position, respectively.

4. A filter press according to claim 3, wherein each cam is connected to that connecting link of the two connecting links associated with that plate which turns in a sense or rotation identical with the movement imparted by the engaging dog to the cam upon straightening of the connecting links.

5. A filter press according to claim 1, said engaging dog being movable alternately in a direction in which the plates are moved for opening and in an opposite direction, said dog including means for overriding the cams when moving in said opposite direction.

6. A filter press according to claim 1, said filter press including an elongated track means running in said longitudinal direction, carriages mounted on the track means for movement therealong each filter plate being suspended from a carriage, said cams and said connecting means being disposed on said carriages.

7. A filter press according to claim 6, wherein said engaging dog is movable in a further track means disposed above the said carriage track means.

8. A filter press according to claim 6, said connecting means between adjacent filter plates comprising a pair of connecting links pivotally connected together at first ends thereof and operatively connected, one to each of the adjacent plates at the opposite ends thereof, said links being movable about said pivot connection towards each other when the adjacent plates close against each other and movable about said pivot connection away from each other to a more straightened condition when the adjacent plates move apart to said separated condition.

9. A filter press according to claim 8, each said connecting link consisting of a set of two fixedly connected link arms located symetrically one on each side of the vertical median plane of the filter press extending in the longitudinal direction for maintaining the carriages in a position extending perpendicular to the said longitudinal direction.

10. A filter press according to claim 9, wherein the connecting links of each pair are pivotally connected to a common axle at the said first ends, and at their said opposite ends the said connecting links are pivotally connected to main axles of the adjacent filter plates, the carriage of each adjacent filter plate also being mounted on its respective main axle, and including rollers also on said main axles engaging the said elongated track means.

11. A filter press according to claim 10, including a hub fixedly interconnecting one set of link arms at each main axle, said cam associated with the filter plate of that axle being mounted on said hub.

12. A filter press according to claim 1, the filter plates being arranged such that for each run of the engaging dog along the filter press in the opening direction, a plurality of said filter plates are separated from each other.

13. A filter press according to claim 12, wherein the frontmost filter plate in the opening direction is operatively connected with a hydraulically operated head piece of the filter press, the displacement of said head piece from the closed position of the filter press determining the number of filter plates simultaneously separated by movement of the engaging dog in said opening direction.

14. A filter press according to claim 1, including means for reversing the movement of the engaging dog in dependence on the resistance offered by the said cam which it engages.

15. A filter press according to claim 1, including a switch means for stopping the opening of the press and starting the closing movement of the plates in dependence on the position of the engaging dog at the moment of reversal of the engaging dog from movement in the opening direction to movement in the closing direction.

16. A filter press according to claim 1, in which the connection of the connection means is easily detachable.

* * * * *